(12) United States Patent
Ursitti et al.

(10) Patent No.: US 10,231,111 B2
(45) Date of Patent: *Mar. 12, 2019

(54) SYSTEM AND METHOD FOR ESTABLISHING A USER CONNECTION

(71) Applicants: Daniel Ursitti, Playa del Rey, CA (US); Adam R. Berke, East Northport, NY (US)

(72) Inventors: Daniel Ursitti, Playa del Rey, CA (US); Adam R. Berke, East Northport, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,313

(22) Filed: Jul. 10, 2017

(65) Prior Publication Data

US 2017/0311367 A1    Oct. 26, 2017

Related U.S. Application Data

(63) Continuation-in-part of application No. 14/875,492, filed on Oct. 5, 2015, now Pat. No. 9,706,519.
(Continued)

(51) Int. Cl.
| | |
|---|---|
| H04W 4/02 | (2018.01) |
| H04W 4/21 | (2018.01) |
| H04W 8/00 | (2009.01) |
| H04L 29/08 | (2006.01) |
| H04W 4/021 | (2018.01) |
| H04W 48/04 | (2009.01) |
| H04W 68/00 | (2009.01) |
| H04W 68/12 | (2009.01) |

(Continued)

(52) U.S. Cl.
CPC .......... *H04W 8/005* (2013.01); *H04L 67/18* (2013.01); *H04W 4/023* (2013.01); *H04W 48/04* (2013.01); *H04W 68/00* (2013.01); *H04W 68/12* (2013.01); *H04W 76/14* (2018.02); *H04W 76/23* (2018.02); *H04W 4/021* (2013.01); *H04W 4/21* (2018.02)

(58) Field of Classification Search
CPC ..... H04W 4/021; H04W 4/023; H04W 4/206; H04W 68/00; H04W 68/12
See application file for complete search history.

(56) References Cited

U.S. PATENT DOCUMENTS 8,914,230 B2    12/2014   Schlesinger et al.
9,042,919 B2    5/2015    Trussel et al.
(Continued)

*Primary Examiner* — Babar Sarwar
(74) *Attorney, Agent, or Firm* — Jeffer Mangels; Butler & Mitchell LLP; Brennan C. Swain, Esq.

(57) ABSTRACT

A system for providing a user connection between first and second mobile devices that includes a first software application executable on the first mobile device in communication with a server. The first mobile device includes a first geo-fence having a first radius. The software application is configured to permit a first user to send a connection request to a second user. When the second user accepts the connection request a device connection is made between the mobile devices. The second user mobile device has a second geo-fence with a second radius. When the device connection is made, an initial distance is determined between the mobile devices. The initial distance is greater than the sum of the first radius and the second radius. When the distance between the first and second mobile devices is less than the sum of the first radius and the second radius the device connection is terminated.

14 Claims, 15 Drawing Sheets

Related U.S. Application Data

(60) Provisional application No. 62/059,244, filed on Oct. 3, 2014.

(51) Int. Cl.
*H04W 76/14* (2018.01)
*H04W 76/23* (2018.01)

(56) References Cited

U.S. PATENT DOCUMENTS

| | | | |
|---|---|---|---|
| 9,191,352 B2 | 11/2015 | Parmar et al. | |
| 9,445,230 B1 | 9/2016 | Sipher et al. | |
| 9,503,516 B2 | 11/2016 | Agarwal | |
| 2010/0261469 A1* | 10/2010 | Ribeiro | H04W 99/00 455/423 |
| 2011/0306366 A1* | 12/2011 | Trussel | H04L 63/0807 455/457 |
| 2012/0079019 A1* | 3/2012 | Miettinen | G06Q 50/00 709/204 |
| 2013/0204676 A1 | 8/2013 | Hindi et al. | |
| 2013/0226453 A1 | 8/2013 | Trussel et al. | |
| 2013/0331127 A1* | 12/2013 | Sabatelli | H04W 4/021 455/456.3 |
| 2014/0129135 A1 | 5/2014 | Holden et al. | |
| 2014/0164118 A1* | 6/2014 | Polachi | G06Q 30/0261 705/14.57 |
| 2014/0243040 A1* | 8/2014 | Bienas | H04W 36/30 455/552.1 |
| 2014/0357228 A1* | 12/2014 | Luft | H04B 7/0456 455/411 |
| 2014/0368601 A1* | 12/2014 | deCharms | H04W 4/021 348/14.02 |
| 2015/0004901 A1* | 1/2015 | Agiwal | H04W 76/023 455/39 |
| 2015/0031388 A1* | 1/2015 | Chatterjee | H04W 4/021 455/456.1 |
| 2015/0163629 A1* | 6/2015 | Cheung | H04W 4/021 455/456.1 |
| 2015/0195235 A1 | 7/2015 | Trussel et al. | |
| 2016/0014663 A1* | 1/2016 | Berggren | H04W 36/22 455/436 |
| 2016/0100355 A1* | 4/2016 | Chen | H04W 8/005 370/232 |
| 2016/0219639 A1* | 7/2016 | Agiwal | H04W 8/005 |

\* cited by examiner

SYSTEM AND METHOD FOR ESTABLISHING A USER CONNECTION

CROSS REFERENCE TO RELATED APPLICATIONS

This application is a continuation-in-part of U.S. patent application Ser. No. 14/875,492, filed on Oct. 5, 2015, which claims the benefit of U.S. Provisional Application No. 62/059,244, filed Oct. 3, 2014, which are both incorporated by reference herein in their entireties.

FIELD OF THE INVENTION

The present invention relates generally to a system and method for location sharing and meeting planning between individuals.

BACKGROUND OF THE INVENTION

It is often difficult for parties to meet up at a location, such as a restaurant, as one party may be waiting while the other party is late. However, mobile telephones and other related modern technology often include geo-location or navigation that allows an individual's location to be known. The present invention provides a system and method whereby parties attempting to meet at a location can be provided with the other individuals estimated time arrival, among other useful pieces of information. For related systems see U.S. Patent Publication No. 2011/0306366 to Trussel, published Dec. 15, 2011, U.S. Patent Publication No. 2013/0226453 to Trussel, published Aug. 29, 2013, and U.S. Patent Publication No. 2014/0129135 to Holden, published May 8, 2014, and U.S. Patent Publication No. 2013/0204676 to Hindi, published Aug. 8, 2013, the entireties of which are incorporated herein by reference.

SUMMARY OF THE PREFERRED EMBODIMENTS

In accordance with a first aspect of the present invention there is provided a system for providing a user connection between first and second mobile devices that includes a server, and a first software application executable on the first user mobile device in communication with the server. The first user mobile device includes a first geo-fence having a first radius. The first software application is configured to permit a user of the first user mobile device to send a connection request to a user of a second user mobile device. When the second user mobile device accepts the connection request a device connection is made between the first user mobile device and the second user mobile device. The second user mobile device has a second geo-fence with a second radius. When the device connection is made (via the server), an initial distance is determined between the first user mobile device and the second user mobile device. The initial distance is greater than the sum of the first radius and the second radius. When the distance between the first and second mobile devices is less than the sum of the first radius and the second radius a user connection is made and the device connection is terminated.

In a preferred embodiment, the first radius is the same as the second radius. Preferably, the system includes a second software application executable on the second user mobile device in communication with the server. In a preferred embodiment, when the first user mobile device and the second user mobile device are a predetermined fraction of the initial distance from one another a notification is sent by the server to the first and second user mobile devices. Preferably, the fraction of the initial distance is half of the initial distance. After the device connection is made the server sends location information to the first and second user mobile devices. The location information includes at least one of estimated time of arrival, distance until user connection and direction of travel of the other user.

In accordance with another aspect of the present invention there is provided a computer-readable, non-transitory medium including instructions that, when executed by a source device in cooperation with a server, enables connection of the source device with a recipient device when performing steps that include generating a connection request, by a sender, using the source device, for a recipient of the recipient device to connect to the source device, receiving the connection request at the server where the server creates a connection request notification, transmitting the connection request notification to the recipient device, transmitting location data from the source device to the server upon acceptance of the connection request from the recipient device, transmitting location data from the recipient device to the server upon acceptance of the connection request by the recipient device, where the server establishes an initial distance between the source device and the recipient device upon receipt of location data from the source device and the recipient device, and transmitting from the server to the recipient device and source device comprising real-time, dynamically updated proximity detail data that is viewable on the recipient device and the source device. When the source device and recipient device come within a predetermined distance of one another, the source device and the recipient device stop transmitting location data to the server.

In a preferred embodiment, the connection request notification includes a customized URL link. Preferably, the instructions also include the step of transmitting a notification when the source device and the recipient device are within a predetermined fraction of the initial distance from one another.

In accordance with another aspect of the present invention there is provided a computer-implemented method of providing a user connection between first and second user mobile devices. The method includes transmitting a connection request, by a sender, from the first user mobile device to a server, and transmitting the connection request from the server to the second user mobile device. When the connection request is accepted by a recipient, the second user mobile device transmits to the server second user mobile device location data. The method also includes transmitting from the first user mobile device first user mobile device location data. The server determines an initial distance between the first user mobile device and the second user mobile device after it receives the first and second first user mobile device location data. The method also includes transmitting proximity detail data from the server to the first and second user mobile devices, transmitting updated proximity detail data from the server to the first and second user mobile devices at predetermined intervals, and terminating the transmission of first user mobile device location data to the server when the first and second user mobile devices are within a predetermined distance of one another.

In a preferred embodiment, the present invention assists in the connection of two or more persons or entities through timing and location notification. As a result, a first user will know the approximate arrival time of a second user. Preferably, the system is embodied in a mobile software application or "app" that runs on a user's smart phone, tablet, computer or the like. The software application is essentially a proximity notifier that turns a user's smart phone or tablet into a vicinity notification system for temporary on-demand peer-to-peer locating. The software application integrates with the contacts in a user's phone that also have the software application installed and allows the two users to locate each other without the need to continuously send text messages, emails or calls back and forth. In a preferred embodiment, the software application determines ground speed, distance and direction between users to display a user's estimated time of arrival to the other user and vice versa. The direction can be displayed on the GUI via a directional indicator. In a preferred embodiment, the software application automatically alerts the second user of the first user's distance from the final destination and from which direction the second user is arriving as soon the invitation is accepted.

In accordance with another aspect of the present invention, there is provided a computer-implemented method of providing a user connection between first and second user mobile devices. The method includes transmitting a location of a fixed meeting location, by a sender, from the first mobile device to the server, transmitting a connection request, by the sender, from the first user mobile device to the server, and transmitting the connection request from the server to the second user mobile device. When the connection request is accepted by a recipient, a device connection is established and the second user mobile device transmits to the server second user mobile device location data. The method also includes transmitting from the first user mobile device first user mobile device location data and the server determines at least a first initial distance. The method also includes transmitting proximity detail data from the server to the first and second user mobile devices. The proximity detail data includes at least one of estimated time of arrival, distance until user connection, distance between the first user mobile device and the fixed meeting location, distance between the second user mobile device and the fixed meeting location or the sum of the distance between the first user mobile device and the fixed meeting location and the distance between the second user mobile device and the fixed meeting location. The method also includes transmitting updated proximity detail data from the server to the first and second user mobile devices at predetermined intervals, and terminating the transmission of first user mobile device location data to the server when the first and second user mobile devices are within a predetermined distance of one another.

In a preferred embodiment, the first initial distance is the sum of the distance between the first user mobile device and the fixed meeting location and the distance between the second user mobile device and the fixed meeting location when the device connection is established. Preferably, when the sum of the distance between the first user mobile device and the fixed meeting location and the distance between the second user mobile device and the fixed meeting location is a predetermined fraction of the first initial distance a notification is transmitted to the first and second user mobile devices.

In a preferred embodiment, the first initial distance is the distance between the first user mobile device and the fixed meeting location and a second initial distance is the second user mobile device and the fixed meeting location. Preferably, when the distance between the first mobile device is a predetermined fraction of the first initial distance a notification is transmitted to the second user mobile device and when the distance between the second mobile device is a predetermined fraction of the second initial distance a notification is transmitted to the first user mobile device.

In use, once a connection or meeting is made between two users or a predetermined time limit is reached, the connection is terminated and dissolved from the device leaving no further location information. This is done to protect a user's privacy. In other words, as soon as the two users meet up or connect, the location information for the second user and all history related thereto disappears from the first user's phone and vice versa. In a preferred embodiment, the software application includes a predetermined geo-fence around each mobile device. Each geo-fence has a radius. The geo-fence radius can be adjustable by the user. In another embodiment it can be predetermined and not adjustable by the user. In preferred embodiment, the geo-fence radius is between about 2 feet to about 0.25 miles. In a more preferred embodiment, the geo-fence radius is between about 10 feet and about 100 feet. In the most preferred embodiment the geo-fence radius is about 5 to about 20 feet. In this embodiment, as soon as the two users' geo-fences overlap, the connection is made and the location information and history from each users' phone is deleted.

In an exemplary embodiment, within the software application, User A initially selects User B's contact information. The software application has access to the mobile device's contacts. Once User B is selected, a connection request is sent User B. The connection request is received by User B's mobile device and is displayed User B as a notification, text message (SMS) or the like. For example, the text message says "Do you accept User A's connection request?" and includes a hyperlink. User B accepts the connection request by clicking on the link and a device connection is made (referred to herein as a "device connection"). User A and User B's mobile devices are now linked. User A's mobile device is sharing its location information with User B's mobile device and vice versa. At the time of the device connection the distance between the two mobile devices is determined (referred to herein as the "initial distance"). For each user's mobile device, the speed of travel is determined to establish approximate time of meeting and this information is displayed on the other user's software application/GUI. In a preferred embodiment, a time to user connection and distance to user connection is displayed on each mobile device. In another embodiment only time to user connection or distance to user connection can be displayed. Once a predetermined distance of the initial distance has been traveled, each user is notified that this has occurred. For example, once half of the initial distance has been traveled (other fractions of the initial distance are within the scope of the present invention) both User A and User B are notified. Next, once User A's geo-fence overlaps with User B's geo-fence, the user connection is made and both users are notified. The location information and history is them terminated and deleted from each user's mobile device.

An example where User A is at the airport will now be used. User A sends a connection request to User B and the connection request is accepted, thus establishing the device connection. In the example, User B accepts the request when User B is 10 miles north of User A. User A can see on their mobile device that User B is 10 miles away and to the north. User B can see on their mobile device that User A is 10 miles away and to the south. Essentially, both users are seeing the same information on the screen except that the direction is the opposite. When User B reaches the 5 mile point (half way), both users are notified (via text message or the like). Assuming the geo-fences are set at a radius of 20 feet, once User B is within 40 feet of User A the geo-fences overlap, a notification is sent to both users (via text message or the like) and the user connection is made. or their preset "personal space radii" (described below) have touched, the connection and tracking between devices is canceled and removed from the device. In a preferred embodiment, no memory of the individual connection is retained (e.g., the location).

In a preferred embodiment, a user can select up to 3 contacts (in another embodiment it can be more or less) to connect with. Using User A as the initiator and selecting to make a user connection with Users B, C and D, User A sends a connection request to Users B, C and D. Users B, C and D must each individually accept the request. This establishes a device connection between User A and each of Users B, C and D, individually. In a preferred embodiment, the GUI of the software application includes the ability to view the status of all three users simultaneously. However, the other users (i.e., Users B, C and D cannot see each other's status or arrival time.

In a preferred embodiment, the system includes the following modules: sign in, log in, account, contacts, tracking, favorites, support, notifications and social on at least one of the software application (the operating system side) or the associated server (the administrator side).

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
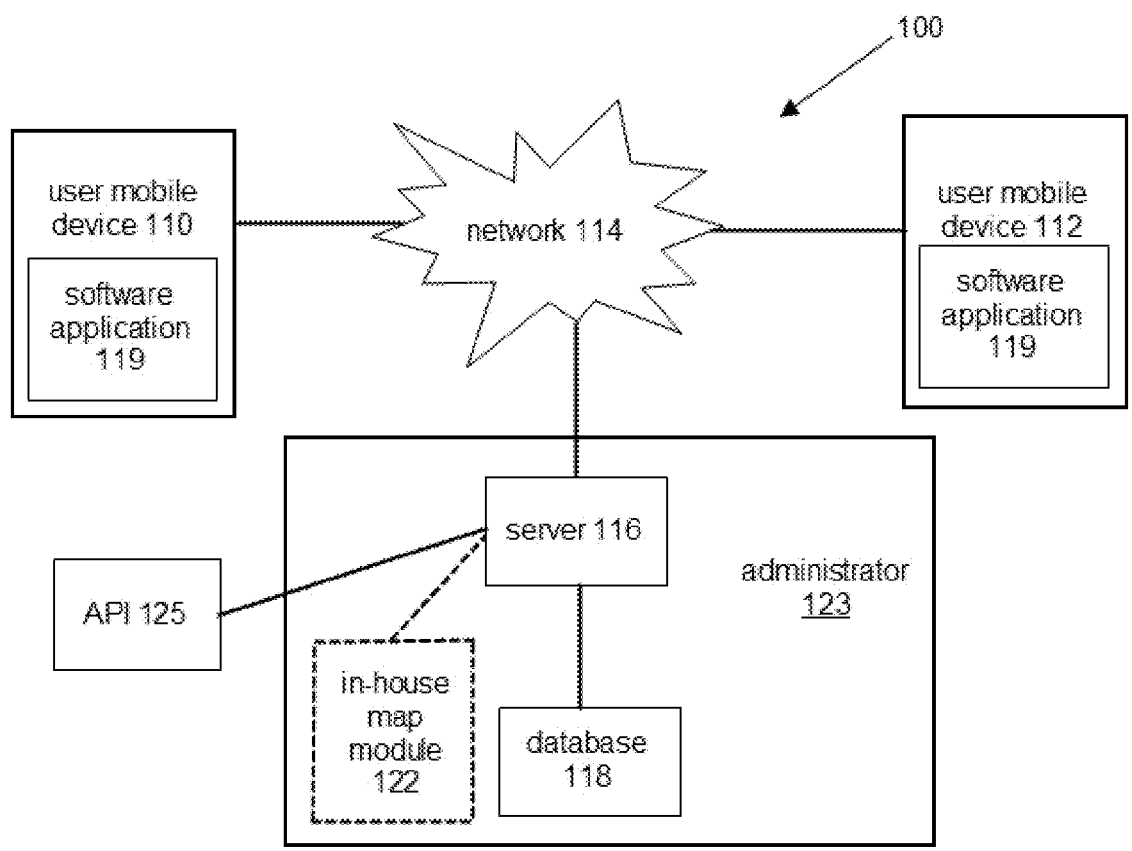
FIG. 1 is a diagram showing a networked computing environment that allows implementation of the methods and systems disclosed herein.

The following description and drawings are illustrative and are not to be construed as limiting. Numerous specific details are described to provide a thorough understanding of the disclosure. However, in certain instances, well-known or conventional details are not described in order to avoid obscuring the description. References to one or an other embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

It will be appreciated that the present invention provides a way for location to be shared among at least two parties. It allows resolution of the temporary ambiguity regarding meet up time between the parties in a real-time manner, but without forcing a long-term relationship or allowing the parties to view the other party's location after a user connection has been made.

The drawings herein and the following discussion are intended to provide a brief, general description of a suitable computing environment in which the subject matter disclosed herein may be implemented. Although not required, aspects of a system and method for sharing location information in a networked computing environment will be described in the general context of computer-executable instructions, such as program modules, being executed by a personal computer and/or computer-readable media on which such instructions are stored. Generally, program modules include routines, programs, objects, components, data structures, etc., that perform particular tasks or implement particular abstract data types. Moreover, those skilled in the art will appreciate that the invention may be practiced with other computer system configurations, including hand-held devices, cellular or mobile telephones, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, a preferred embodiment of the present invention is described in the context of an exemplary computer network system 100 as illustrated. System 100 includes user mobile devices 110 and 112, such as cellular or mobile telephones, personal computers or workstations, that are linked via a communication medium, such as a network 114 (e.g., the Internet), to an electronic device or system, such as a server 116, that is part of an administrator system 123. It will be appreciated that this essentially means that the components in box 123 in FIG. 1 are part of a system operated by the company that owns or administers the software application to users. However, this is not a limitation on the present invention. In a preferred embodiment, the user mobile devices 110 and 112 each include a source client or software application 119 running thereon. As shown in some of the figures (e.g., FIG. 9), the software application 119 is referred to herein as 'ISH. The server 116 may further be coupled, or otherwise have access, to a database 118 or databases and other components, such as electronic storage, and computer systems (not shown). It will be appreciated that the database 118 is configured to store account information for all the users who are registered with the system. Although the embodiment illustrated in FIG. 1 includes a single server 116 coupled to two user mobile devices 110 and 112 (first and second user mobile devices 110 and 112) via the network 114, it should be recognized that, as described herein, embodiments of the invention may be implemented using two or more such user mobile devices coupled to one or more such servers. Moreover, the network 114 may include or otherwise be coupled to one or more telecommunication towers 136 (see FIGS. 2 and 3) that provide network connectivity to the user mobile devices.

It should be understood that first and second user mobile devices 110 and 112 include or are otherwise coupled to a computer screen or display. First and second user mobile devices 110 and 112 can be used for various purposes including both network- and local-computing processes. The first and second user devices 110 and 112 are linked via the network 114 to server 116 so that software programs, such as, for example, a browser or other applications, running on the first and second user devices 110 and 112 can cooperate in two-way communication with server 116. Server 116 may be coupled to database 118 and/or electronic storage to retrieve information therefrom and to store information thereto. Moreover, the server 116 may communicate with the first user device 110 (and/or second device 112) and/or GPS/triangulation systems 124 (see FIGS. 3 and 4) known in the art in such manner as to allow the server 116, using map data stored in the database 118, to generate location data, such as, for example, HTML data, that may be used by a browser or similar application to display the location of the first user mobile device 110 (and/or second user mobile device 112). Additionally, the server 116 may be coupled to the computer system in a manner allowing the server to delegate certain processing functions to the computer system. Accordingly, it should be understood that when reference is made herein to the server 116 performing a function, the server 116 not actually be performing the function, but may delegate it to a separate computer system.

In a preferred embodiment, the server 116 is coupled to an application programming interface (API) 125, such as an externally facing API, to communicate data as described below. The externally facing API can provide access to server 116 via secure access channels over the network through any number of methods, such as web-based forms, programmatic access via restful APIs, Simple Object Access Protocol (SOAP), remote procedure call (RPC), scripting access, etc., while also providing secure access methods including key-based access to ensure server 116 and the entire system remains secure and only authorized users, service providers, and/or third parties can gain access thereto. For example, the system may use the Google Maps API or the IOS Maps API. In another embodiment, the API can be part of the administrator's 123 infrastructure (e.g., as part of the computer system discussed above). In other words, the processing maps/location functionality can be "in house" of the administrator 123 or in the software application 119 itself. This is illustrated in FIG. 1 as "in-house map module" 122. Generically, the Maps API 125 and the in-house map module 122 are referred to herein as a "map module." It will be understood that any reference to a map module refers to a computer system that includes the logic capable of executing the tasks of the API 125 described herein (e.g., determine estimated time of arrival, initial distance, direction of travel, etc.). Furthermore, any reference to the API 125 or in-house map module 122 can be substituted with map module. Furthermore, it should be understood that the map module can reside on the server.

Figure 2:
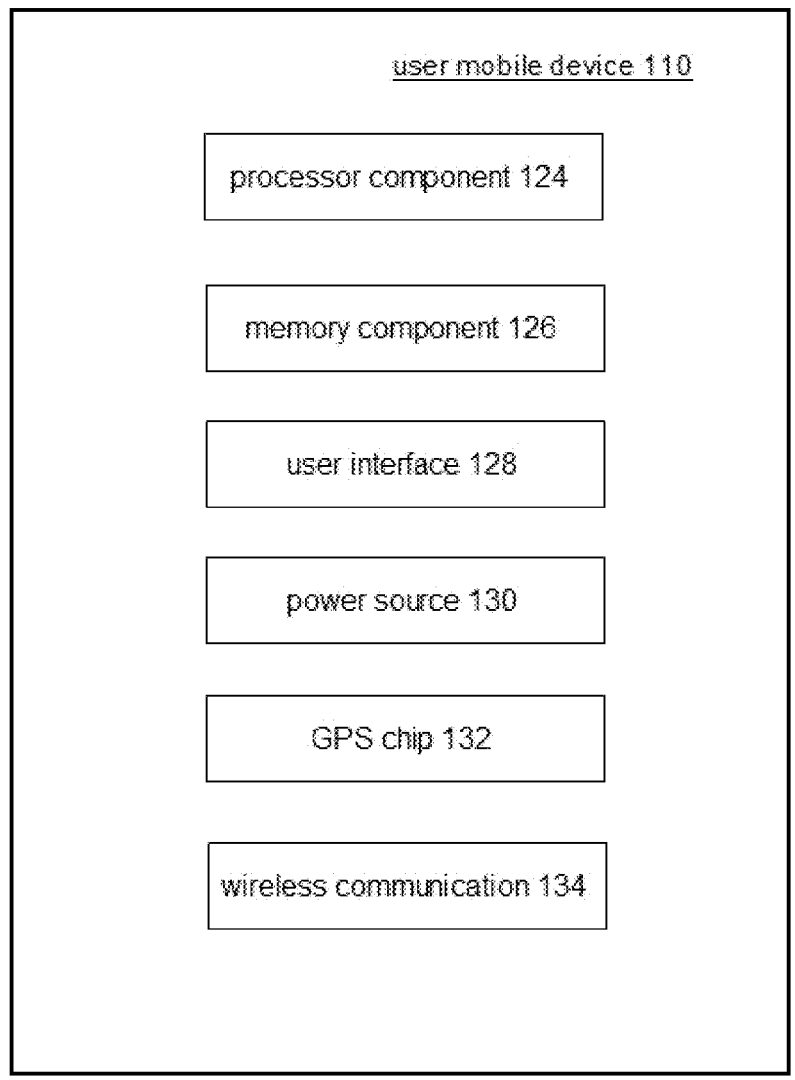
FIG. 2 is a diagram of a user mobile device usable for implementation for the methods and systems disclosed herein.

FIG. 2 depicts an exemplary user mobile device (e.g., first user mobile device 110). The user mobile device 110 includes processor component 124, a memory component 126, some type of user interface 128 that allows the device to receive user input and output information to the user (e.g., a display, touchscreen, speakers, microphone), a power source 130 (e.g., a battery), a GPS chip 132 that detects the device location, and a wireless communication component 134 such as a Wi-Fi chip. The GPS chip 132 periodically obtains the device location and reports it via the wireless communication component 134.

FIGS. 3-7C illustrate the connection between first and second user mobile devices 110 and 112 when the device and user connections are made together with an exemplary set of steps for establishing the connections. In the figures, the two people making the connection or meeting up are User A and User B (or first user and second user). Accordingly, the first user mobile device may be referred to herein as User A's mobile device and the second user mobile device may be referred to as User B's mobile device 112. User A's mobile device 110 is also referred to herein as the source device and User B's mobile device 112 is also referred to herein as the recipient device.

Figure 3:
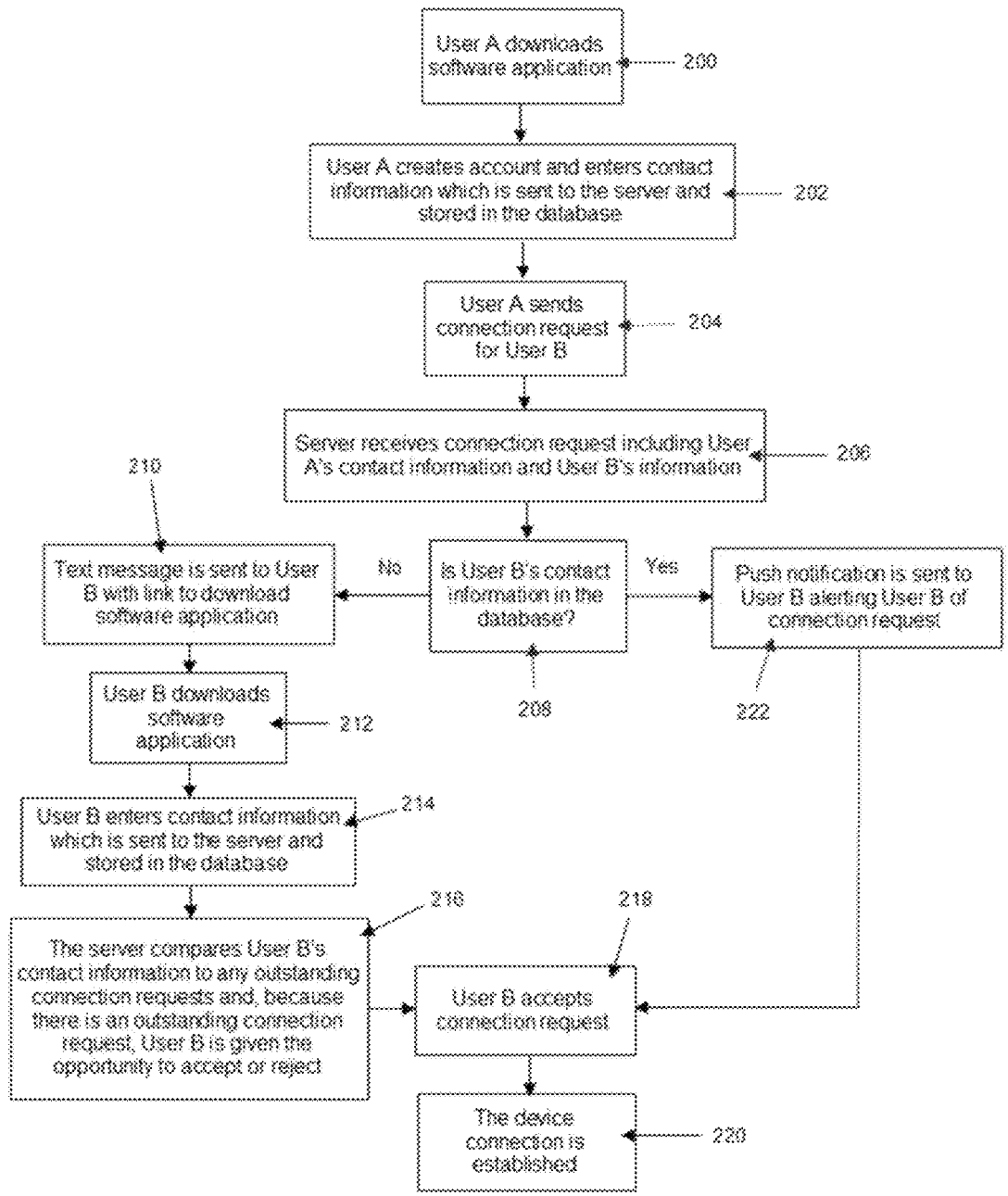
FIG. 3 is a flow chart depicting a portion of the system and method disclosed prior to establishing a device connection.
Figure 8:
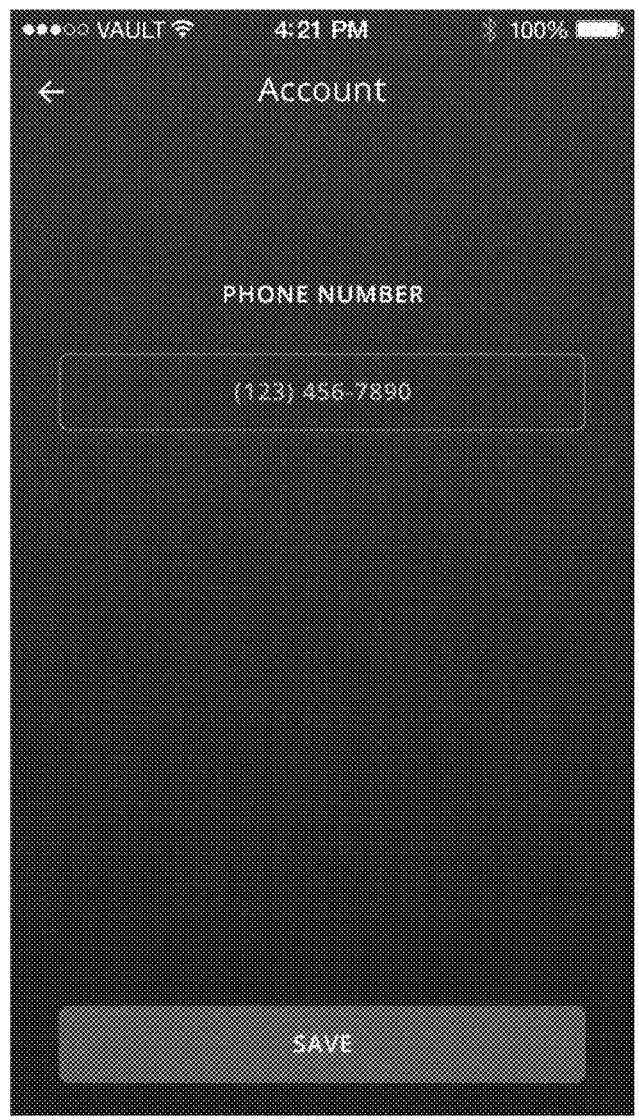
FIG. 8 is an exemplary screenshot from the software application of an account screen.
Figure 9:
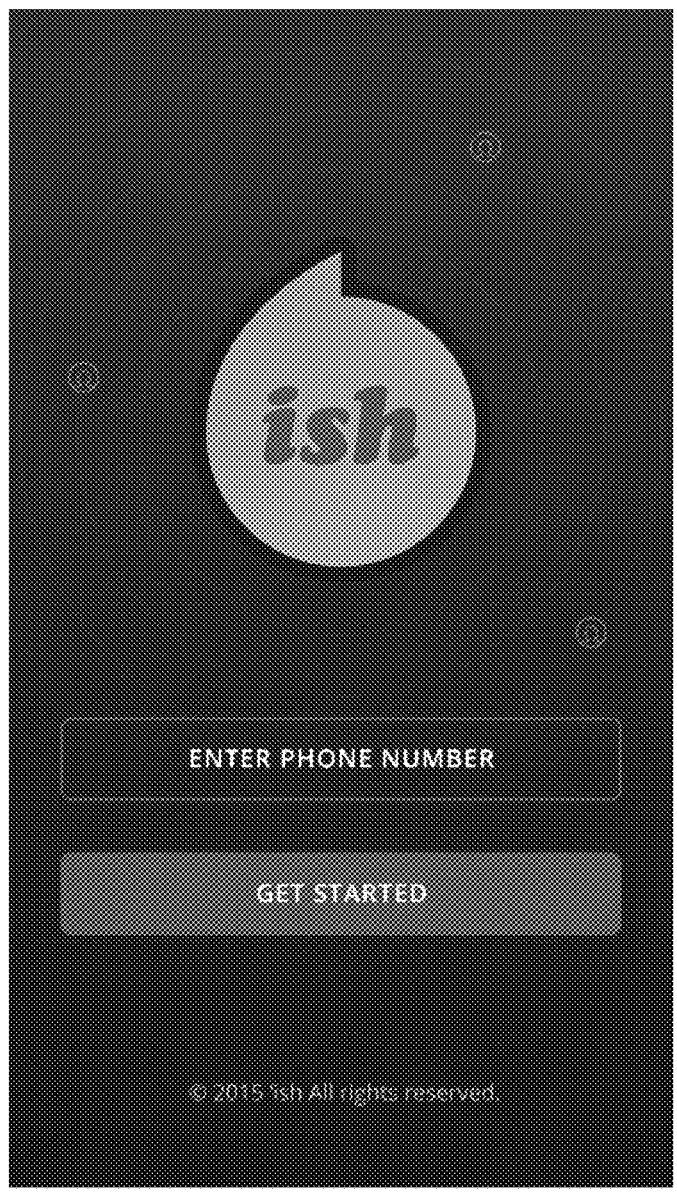
FIG. 9 is an exemplary screenshot from the software application of a log in screen.
Figure 10:
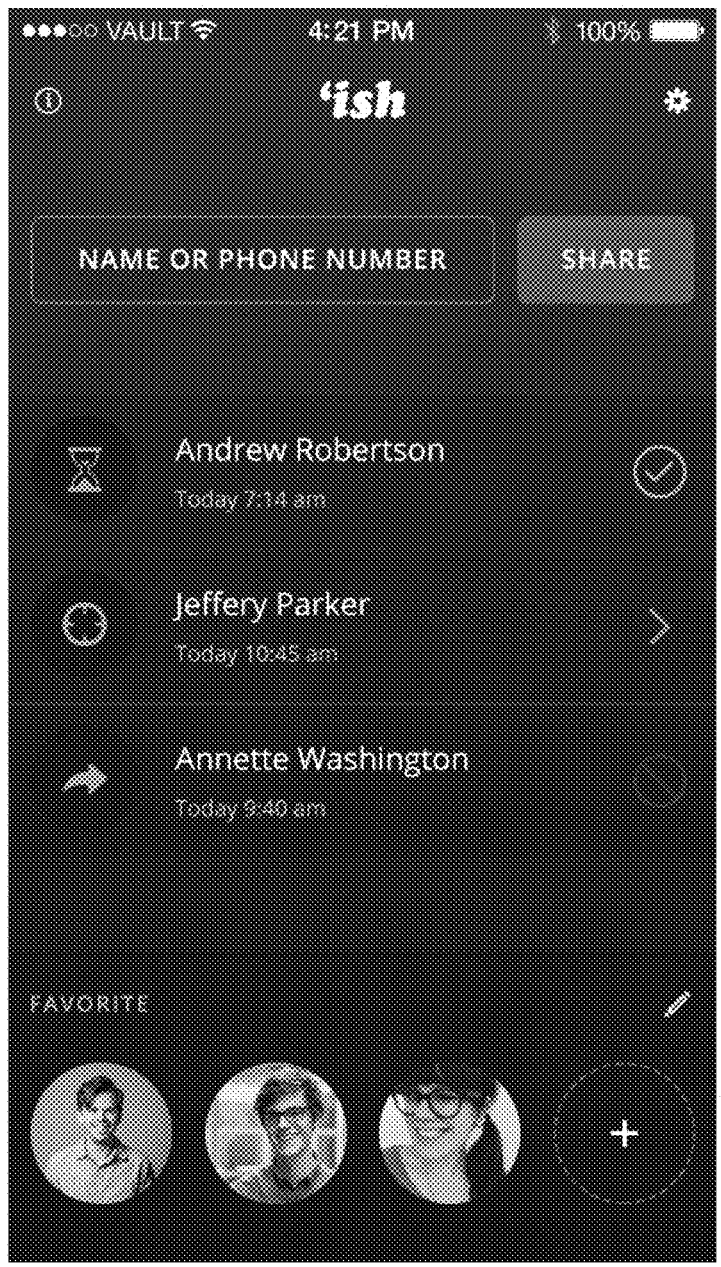
FIG. 10 is an exemplary screenshot from the software application where a user can choose or enter the contact information of a second user they wish to send a connection request.

As shown in FIG. 3, at step 200, User A downloads the software application 119 to their mobile device 110. Then, at step 202, User A creates an account by entering their contact information. In a preferred embodiment, the contact information is just a mobile phone number (see FIG. 8). However, in another embodiment, the contact information can be more or different information, such as email address, home address, etc. The account/contact information is sent to the server 116 and stored in database 118. When User A is ready to meet up with User B, after logging in to the software application 119 by entering their phone number, as shown in FIG. 9 (in another embodiment the software application may require a user to choose a username and password when registering), at step 204, User A sends a connection request for User B. In a preferred embodiment, this is done by selecting User B from the contacts in User A's mobile device 110 (see FIG. 10) and performing an action such as touching a button to send the request. In the exemplary embodiment of FIG. 10, the connection request is sent by pressing "Share" after User B has been selected.

At step 206, the server 116 receives the connection request, which includes User A's contact information and User B's contact information (e.g., phone numbers). At step 208, the database 118 is then searched to determine if User B's contact information is in the database (i.e., whether User B already has an account). If User B does not have an account, an outstanding connection request is established (referred to herein as the "User B outstanding connection request") at the server, and, at step 210, a notification, such as a text message is sent to User B's mobile device 112 letting them know that someone wants to connect with them on 'ISH. The text message preferably includes a URL link that provides the ability to download the software application 119. The notification can be sent be sent by other methods, e.g., email, MMS, push notification, etc. In an exemplary embodiment, the text message is sent by a third party service, such as Twilio.

Figure 11:
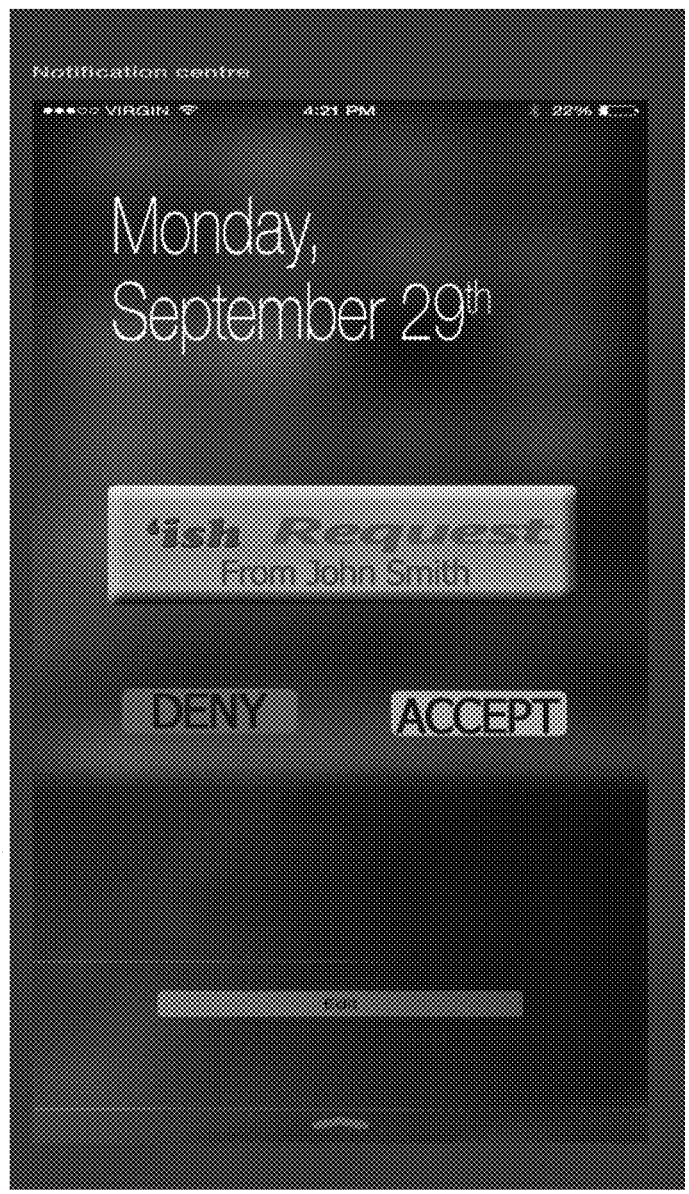
FIG. 11 is an exemplary screenshot from the software application when a user receives a connection request.

At step 212, User B downloads the software application 19 to their mobile device 112. Then, at step 214, User B creates an account by entering their contact information, which is sent to the server 116 and stored in the database 116. At step 216, the server 116 compares User B's contact information to all outstanding connection requests. Because the User B outstanding connection request is present, the connection request appears in User B's pending connection request section. See, for example, FIG. 11. The connection request from User A shows up in User B's pending connection requests and User B can now accept or deny the connection request, as shown in FIG. 11.

Next, at step 218, User B accepts the connection request and the data or signal is sent to the server 116. At step 220, the device connection is established. At this time, the first and second mobile devices 110 and 112 can share location information.

Backing up to step 208, if User B's contact information is in the database 118 (i.e., User B has downloaded the software application 119 and created an account prior to User A sending the connection request), steps 210 to 216 are skipped. Instead, a notification, such as a push notification (or a text message) is sent to User B's mobile device 112. The push notification directs User B to the screen shown in FIG. 11, thereby allowing User B to accept or deny the connection request. Next, at step 218, User B accepts the connection request and the data or signal is sent to the server 116, and at step 220, the device connection is established. At this time, the first and second mobile devices 110 and 112 can share location information.

Figure 4:
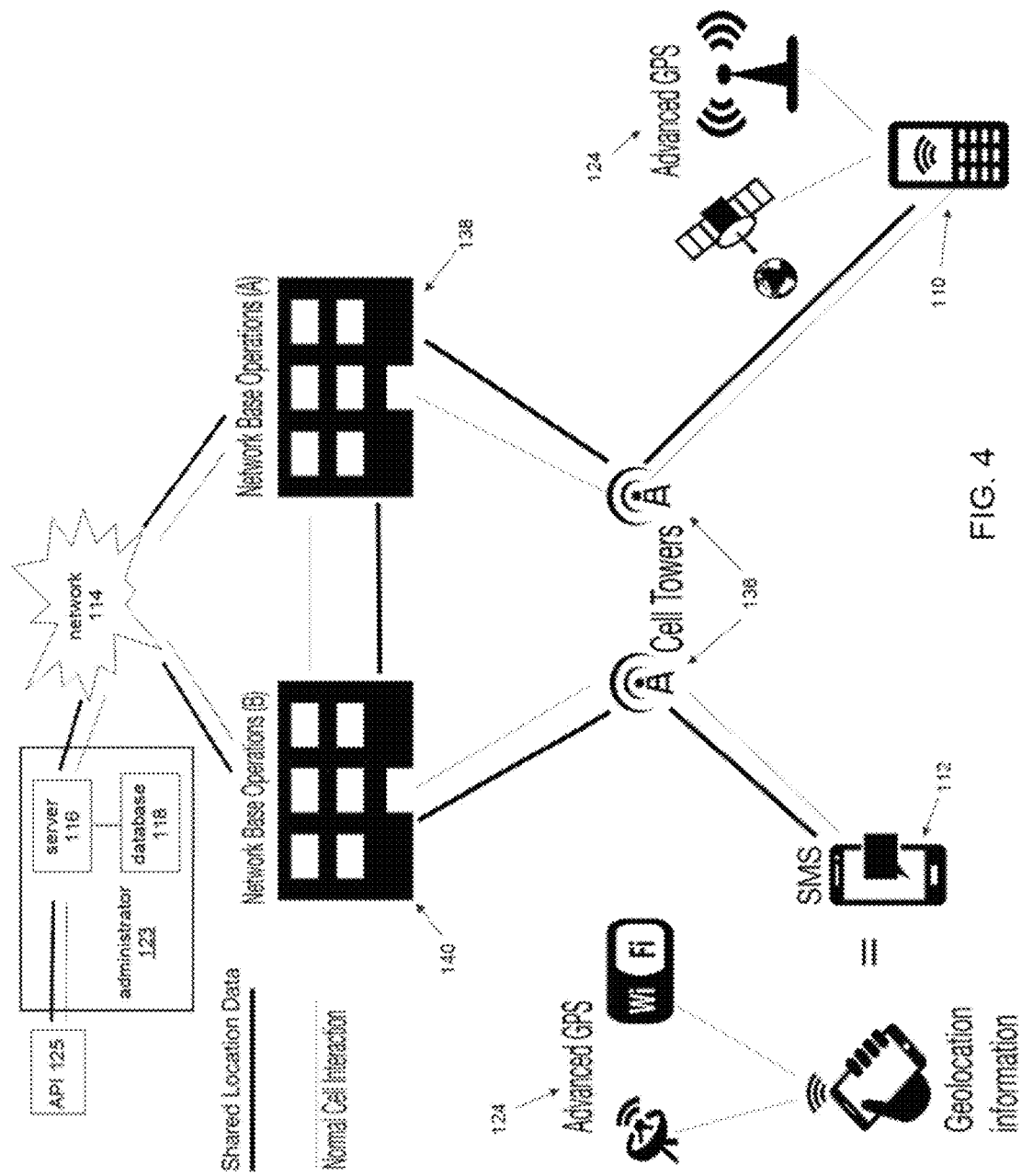
FIG. 4 is a diagram showing the communication between components of the system after a device connection has been established.

FIG. 4 shows an exemplary connection path between first and second user mobile devices 110 and 112, cell towers 136, network base operations A 138, network base operations B 140, network 114, administrator 123 and API 125 after the device connection has been established. It will be appreciated that network base operations A and network base operations B represent User A's and User B's mobile network providers (e.g., Verizon, AT&T, etc.). FIG. 4 shows schematically that, after the device connection has been established, location information or data can be shared between first and second mobile devices 110 and 112 and throughout the network. In a preferred embodiment, the device connection remains open until it is closed either by one of the users (see FIG. 12 and the "stop tracking" button).

Figure 5:
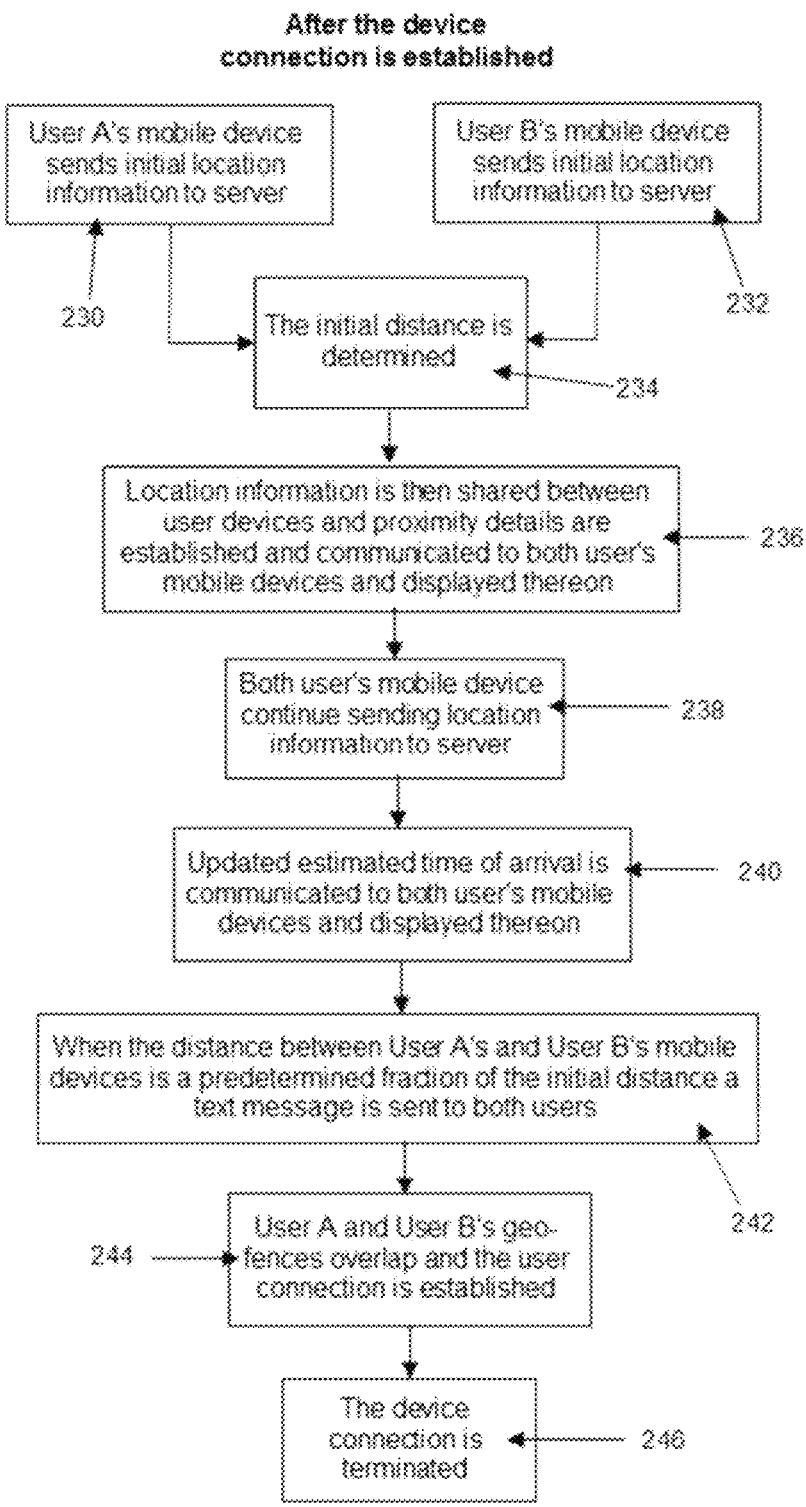
FIG. 5 is a flow chart depicting a portion of the system and method disclosed after the device connection has been established.
Figure 6:
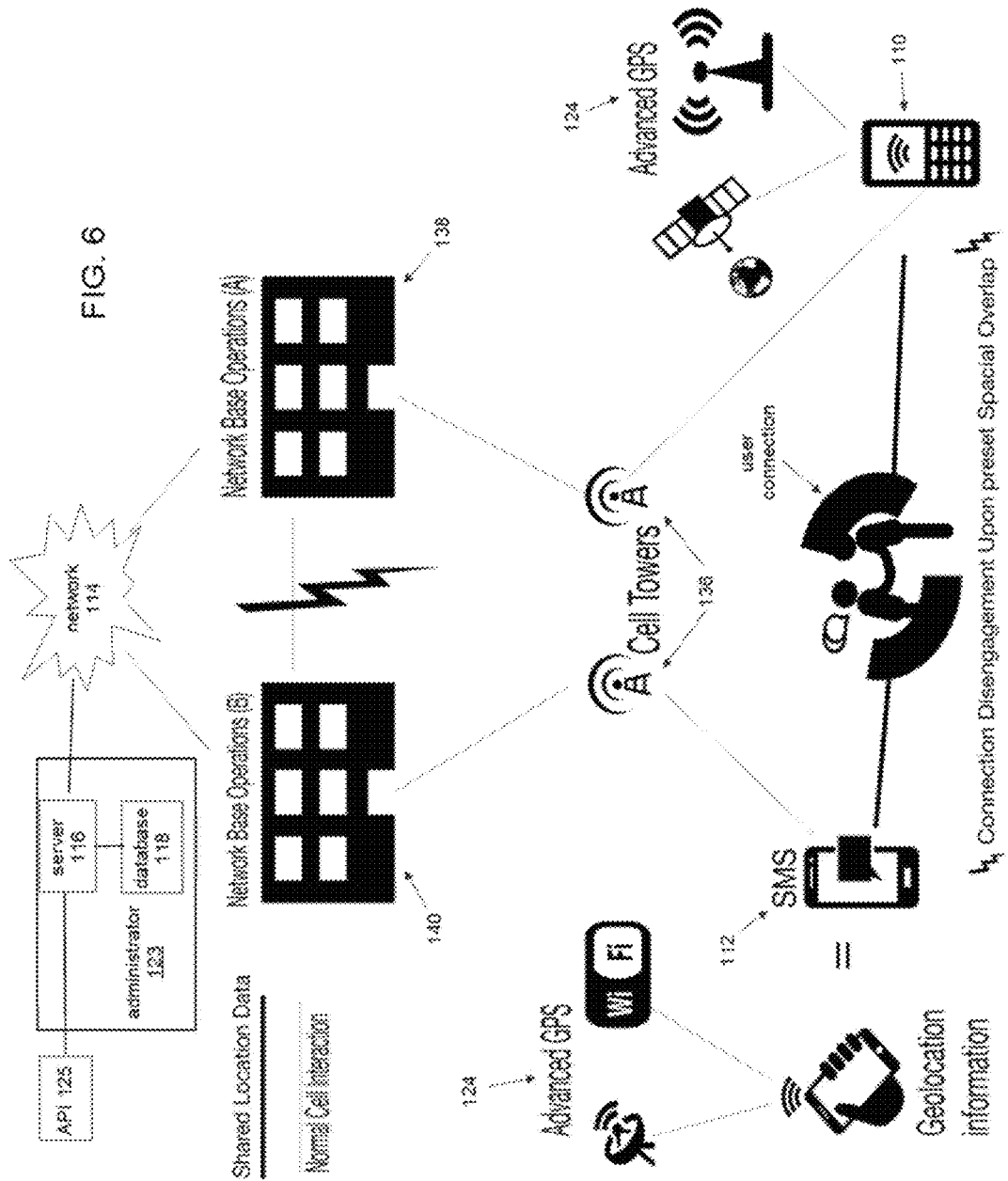
FIG. 6 is a diagram showing the communication between components of the system after a user connection has been established.

FIG. 5 shows the process steps after the device connection has been established. At steps 230 and 232, User A's and User B's mobile devices 110 and 112 send the initial location information or data to the server 116. At this point, the location information of each device (i.e., the latitude and longitude) is communicated to the server 116, at which time an initial distance D1 between User A's device 110 and User B's device 112 is determined (step 234) either by the API 125 or map module. The location information is communicated to the API 125, which in turn communicates arrival data or proximity details to each of User A's and User B's devices 110 and 112. The arrival data is based on speed, distance and direction between the users. It should be understood that the API used, such as the Google Maps API, has the capability to make the arrival data determination. For example, the Google Maps API has the algorithms and logic included for determining estimate time of arrival for travel by car, train, walking and bike. Generally, the location information of the two data points is transmitted to the API and the proximity details (e.g. estimated time of arrival) on each mobile device will be updated based on the calculations made by the API. This is done at every interval the location information is transmitted. Accordingly, a detailed explanation will be omitted. In short, at step 236, location information is then shared between the first and second user mobile devices and proximity details 150 are established and communicated to both mobile devices 150 and displayed thereon.

Figure 12:
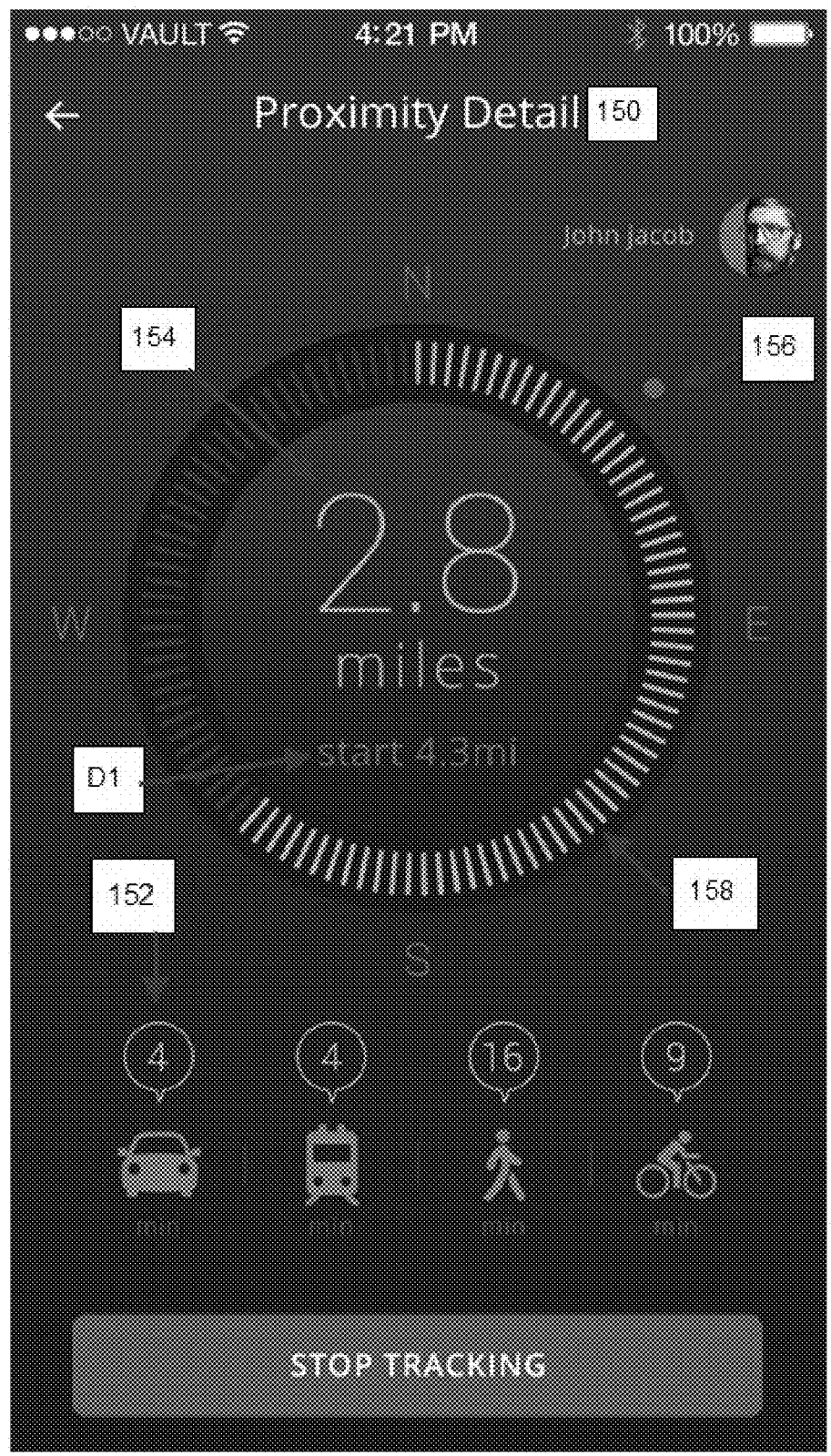
FIG. 12 is an exemplary screenshot from the software application of a screen that includes proximity detail between two users.
Figure 13:
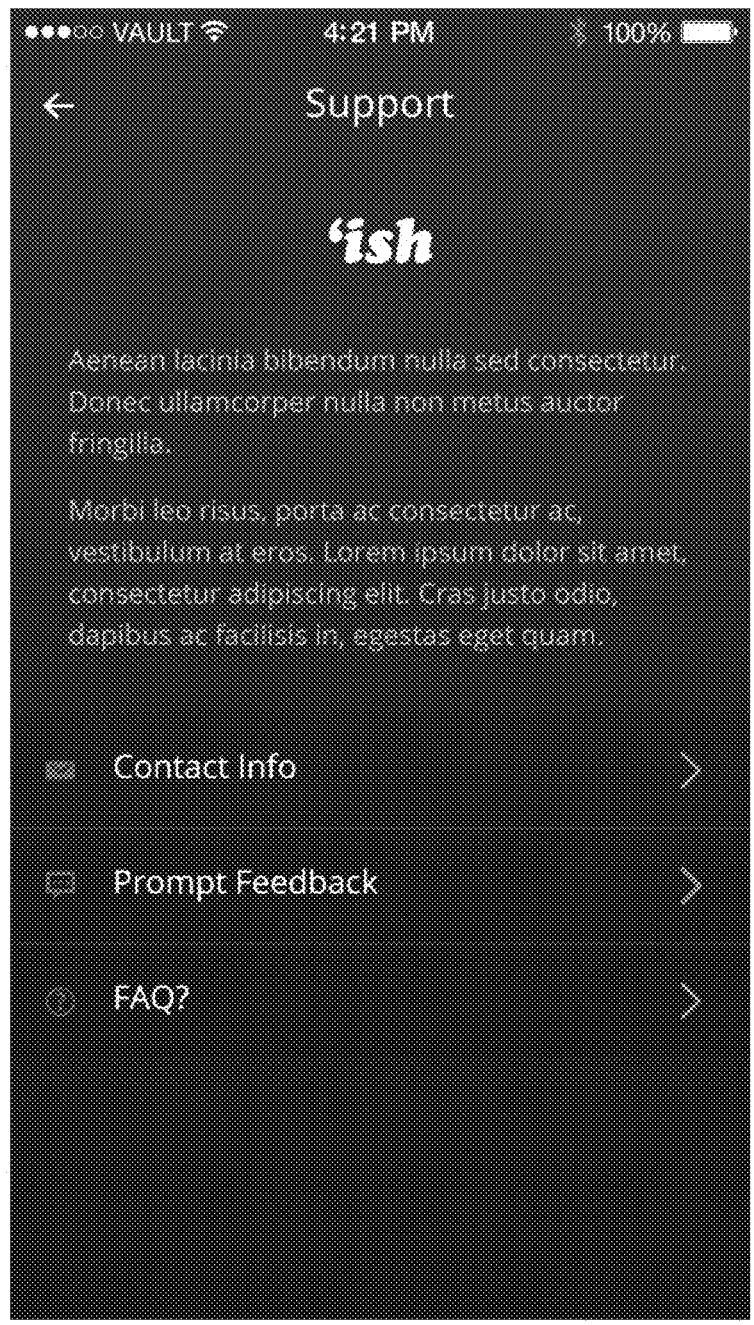
FIG. 13 is an exemplary screenshot from the software application of a help or support screen.

As shown in FIG. 12, the arrival data or proximity details 150 can include estimated time of arrival 152, the present distance 154 between the first and second user mobile devices, and the direction 156 the other user is traveling from. In FIG. 12, the estimated time of arrival 152 is shown for if the user is traveling by car, train, walking or bike. In FIG. 12, the present distance 154 includes a tracking circle 158 that fills in as the distance closes between the first and second user mobile devices. The present distance 154 is also referred to herein as the distance until user connection. In FIG. 12, the direction of travel 156 is shown as a dot or indicator on a compass. In a preferred embodiment, the direction of travel 156 is determined by the compass module in the mobile device's operating system, such as iOS or the like. In another embodiment, the direction of travel 156 can be determined by the API.

Figure 7A:
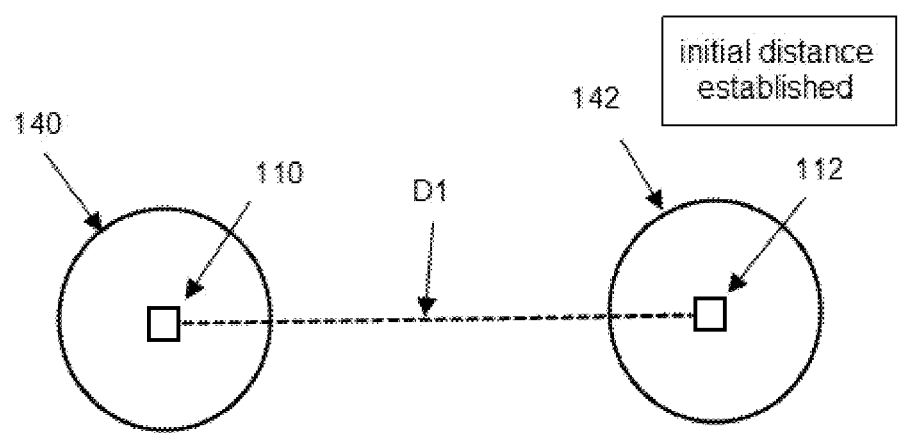
FIG. 7A is a diagram showing the initial distance between mobile devices after the device connection has been established.

In a preferred embodiment, User A's mobile device 110 includes a first geo-fence 140 therearound and User B's mobile device 112 includes a second geo-fence 142 therearound, as is also shown in FIG. 7A. Each geo-fence has a radius. In preferred embodiment, the geo-fence radius is between about 2 feet to about 0.25 miles. In a more preferred embodiment, the geo-fence radius is between about 10 feet and about 100 feet. In the most preferred embodiment the geo-fence radius is about 5 to about 20 feet. The geo-fence capability resides in the software application 119.

At step 238, both user's mobile devices 110 and 112 send location information at predetermined intervals to the server 116, which is communicated to the API 125. At step 240, updated proximity details are communicated from the API 125, through the server 116 and to the mobile devices 110 and 112. It will be appreciated by those of skill in the art that information packets, data packets or data structures are being communicated back and forth between the first and second user mobile devices 110 and 112, the server 116 and the API 125 (or other map module) to continuously (i.e., real-time) or at predetermined intervals update the first and second user mobile devices location information (e.g., latitude and longitude) and, vice versa, the proximity details 150 displayed on the GUI shown in FIG. 12. For example, if the predetermined interval is 5 seconds, then every 5 seconds User A's mobile device 110 sends latitude and longitude information to the server 116 and User B's mobile device 112 sends latitude and longitude information to the server 116. This information is transmitted to the API 125, which determines the distance between the two data points (and other appropriate information) and transmits the proximity data 150 back through the server 116 to the mobile devices 110 and 112 for display on the GUI. In a preferred embodiment, the predetermined intervals that the information packets are sent are between 0.1 seconds and 5 minutes or more.

Figure 7B:
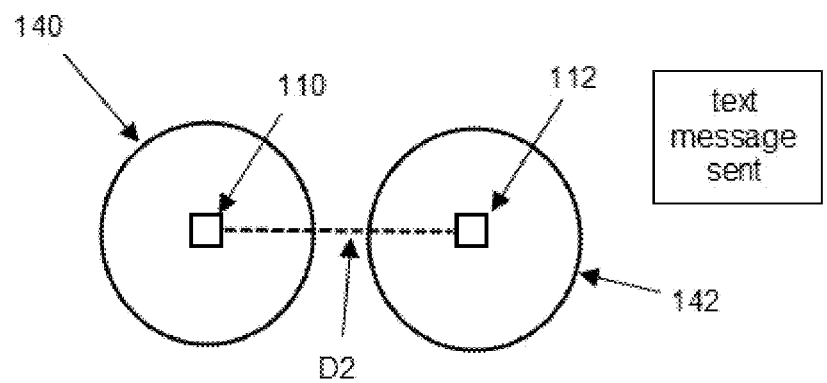
FIG. 7B is a diagram showing the halfway distance between two mobile devices when a text message is sent.

In a preferred embodiment, at step 242, When the distance between User A's and User B's mobile devices is a predetermined fraction of the initial distance D1 a notification, such as a text message or push notification, is sent to both users to alert the users that a fraction of the initial distance D1 has been covered. In other words, the alert can be sent out when the first and second user mobile devices 110 and 112 (or data points) are a second distance D2 from one another. This is illustrated in FIG. 7B. For example, if the initial distance is 4 miles and D2 is half of D1, then a text message is sent out to the users when mobile device 110 is 2 miles from mobile device 112. Any fraction of the initial distance D1 is within the scope of the present invention.

Figure 7C:
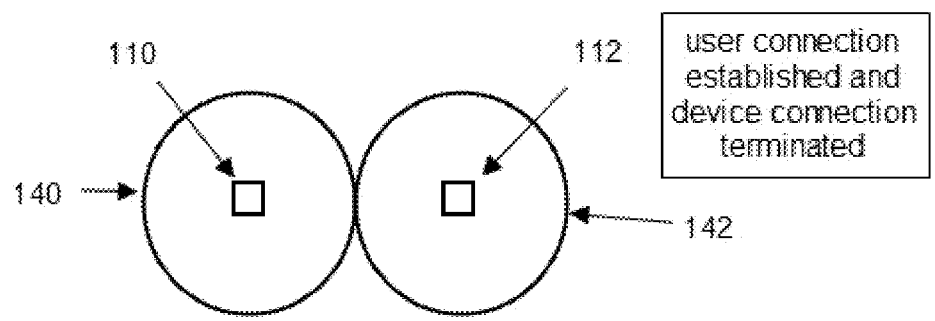
FIG. 7C is a diagram showing the point in time where the two geo-fences overlap, the user connection is established and the device connection is terminated.

At step 244, once the geo-fences overlap with one another, the user connection is established (see FIGS. 6 and 7C) and, at step 246, the device connection is then terminated. In a preferred embodiment, when it is determined that the distance between the first and second mobile devices is less than the sum of the radius of the first geo-fence and the radius of the second geo-fence then a call is transmitted to the server to terminate or close the connection between the two mobile devices. At this point, no more location information is transmitted from the mobile devices and no more proximity detail is shown in the mobile devices. This is illustrated in FIG. 7C. The geo-fence logic states that when the signal that is sent to the map module (e.g., API 125) returns a value that is within or less than the sum of the two radii, then the device connection is terminated. In another embodiment, the device connection can be terminated when the signal that is sent to the map module returns a value that is within or less than the radius.

In a preferred embodiment, the device connection is made through the server, as is shown in FIG. 4. Therefore, a real-time connection between the two mobile devices is established. However, as described herein, the information exchange terminates after the user connection is made, thereby protecting user privacy.

It should be understood that the present invention provides two users to connect of meet up via the use of a software application running on a computer device such as a mobile telephone. Based on the description herein a person of ordinary skill in the art will be able to make and use the invention regardless of the exact description herein. Any type of network connection between the computer devices is within the scope of the present invention. For example, the connection can be made over a cellular network, the Internet, via wifi or the like.

Figure 14:
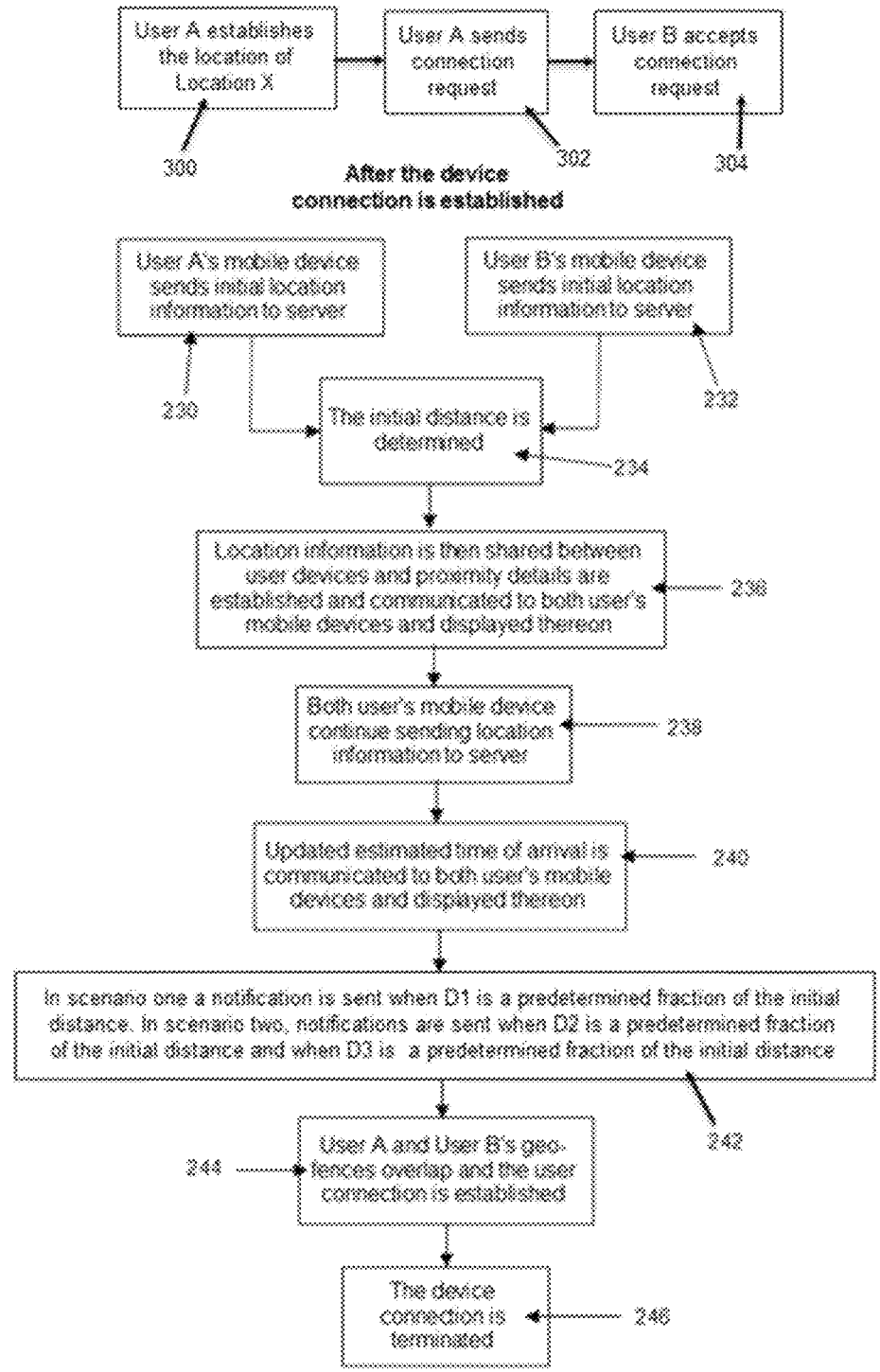
FIG. 14 is a flow chart depicting a three way connection in accordance with another preferred embodiment of the present invention.
Figure 15:
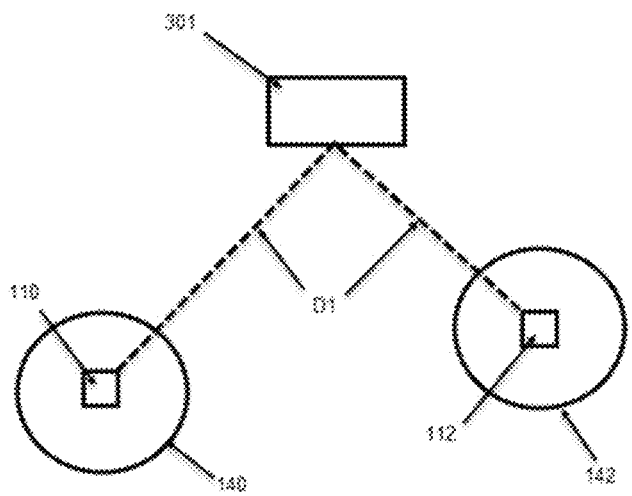
FIG. 15 is a diagram showing the initial distance from User A to Location X and then to User B in a first scenario.
Figure 16:
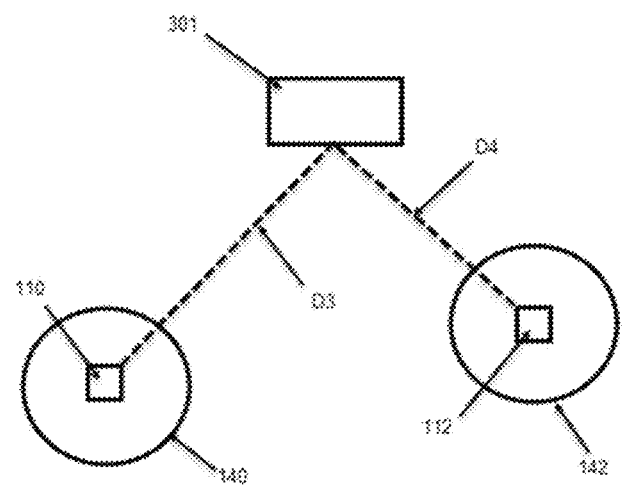
FIG. 16 is a diagram showing the first initial distance from User A to Location X and a second initial distance from User B to Location X in a second scenario.

FIGS. 14-16 show another preferred embodiment of the present invention where a connection is established between two users that are both moving and meeting at a location (referred to herein as a "fixed meeting location"), for example Location X 301. This can be a separate mode from the 2-way, user to user connection discussed above and can be a menu choice within the application. In this situation, at stop 300, via the GUI, User A establishes the location of Location X 301. This can be done by, for example, inputting the address of Location X or selecting the location on a map (often heard to as "dropping a pin") in the art. The location of the fixed meeting location of Location X is communicated to or recognized by the server. User A then sends a connection request to User B 302. User B accepts the connection request 304 and the device connection is established.

After the device connection has been established, at steps 230 and 232, User A's and User B's mobile devices 110 and 112 send the initial location information or data to the server 116. The location of Location X (i.e., the latitude and longitude) has already been communicated to the server 116. At this point, the location information of each device (i.e., the latitude and longitude) is communicated to the server 116, at which time an initial distance is determined. The initial distance can be one of two different distances. In scenario one (see FIG. 15), the initial distance is the total distance from User A's device 110 to Location X and from Location X to User B's device 112. In other words, the initial distance D1 is the sum of the distance between User A's mobile device and the fixed meeting location when the device connection is established and the distance between User B's mobile device and the fixed meeting location when the device connection is established. In scenario two (see FIG. 16), first and second initial distances D3 and D4 can be determined; the distance between User A's device 110 and Location X (the first initial distance D3) and the distance between User B's device and Location X (the second initial distance D4). These distances are determined (step 234) either by the API 125 or map module.

The location information is communicated to the API 125, which in turn communicates arrival data or proximity details to each of User A's and User B's devices 110 and 112. In scenario one, the proximity details (e.g., ETA, distance between devices) are based on the total initial distance D1. In scenario two, proximity details are with respect to Location X. In other words, User A receives ETA or distance information with respect to how far User B is from Location X, and User B receives ETA or distance information with respect to how far User A is from Location X. With this information, User A will know when User B will arrive at Location X. In this scenario, the GUI may include two separate maps showing User A and Location X on one and User B and Location X on the other. In another embodiment, all three locations can be shown on a single map. The arrival data is based on speed, distance and direction between the users. Generally, the location information of the three data points is transmitted to the API and the proximity details (e.g. estimated time of arrival) on each mobile device will be updated based on the calculations made by the API. This is done at every interval the location information is transmitted. In short, at step 236, location information is then shared between the first and second user mobile devices and proximity details 150 are established and communicated to both mobile devices 150 and displayed thereon.

Referring once again to FIG. 14, at step 238, both user's mobile devices 110 and 112 send location information at predetermined intervals to the server 116, which is communicated to the API 125. At step 240, updated proximity details are communicated from the API 125, through the server 116 and to the mobile devices 110 and 112. It will be appreciated by those of skill in the art that information packets, data packets or data structures are being communicated back and forth between the first and second user mobile devices 110 and 112, the server 116 and the API 125 (or other map module) to continuously (i.e., real-time) or at predetermined intervals update the first and second user mobile devices location information (e.g., latitude and longitude) and, vice versa, the proximity details 150 displayed on the GUI shown in FIG. 12. For example, if the predetermined interval is 5 seconds, then every 5 seconds User A's mobile device 110 sends latitude and longitude information to the server 116 and User B's mobile device 112 sends latitude and longitude information to the server 116. This information is transmitted to the API 125, which determines the appropriate distance between the three data points (and other appropriate information) and transmits the proximity data 150 back through the server 116 to the mobile devices 110 and 112 for display on the GUI. In a preferred embodiment, the predetermined intervals that the information packets are sent are between 0.1 seconds and 5 minutes or more.

In a preferred embodiment, at step 242, in scenario one, when the distance between User A's and User B's mobile devices (through Location X, as shown in FIG. 15) is a predetermined fraction of the initial distance D1 a notification, such as a text message or push notification, is sent to both users to alert the users that a fraction of the initial distance D1 has been covered. In other words, the alert can be sent out when the first and second user mobile devices 110 and 112 (or data points) are a second distance from one another. For example, if the initial distance from User A to Location X was 4 miles and initial distance from User A to Location X was 2 miles then the initial distance D1 is 6 miles. Therefore, when the distance closes to 3 miles, then a text message or notification is sent out to the users.

In a preferred embodiment, at step 242, in scenario two, when the distance between User A's mobile device and Location X is a predetermined fraction of the initial distance D3 a notification, such as a text message or push notification, is sent to User B (or both users) to alert User B that User A is a fraction of the initial distance from Location X. Also, when the distance between User B's mobile device and Location X is a predetermined fraction of the initial distance D4 a notification, such as a text message or push notification, is sent to User A (or both users) to alert User A that User B is a fraction of the initial distance from Location X. At step 244, once the geo-fences overlap with one another, the user connection is established (see FIGS. 6 and 7C) and, at step 246, the device connection is then terminated.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges. It will be appreciated that any dimensions given herein are only exemplary and that none of the dimensions or descriptions are limiting on the present invention.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A system for providing a user connection between first and second user mobile devices, the system comprising:
   a server,
   a first software application executable on the first user mobile device in communication with the server,
   wherein the first software application is configured to permit a user of the first user mobile device to send a connection request to a user of a second user mobile device,
   wherein when the second user mobile device accepts the connection request a device connection is made between the first user mobile device and the second user mobile device,
   wherein when the device connection is made, an initial distance is determined between the first user mobile device and the second user mobile device, and
   wherein when the first user mobile device and the second user mobile device are a predetermined fraction of the initial distance from one another a notification is sent by the server to the first and second user mobile devices, wherein the first user mobile device includes a first geo-fence having a first radius, wherein the second user mobile device has a second geo-fence with a second radius, and wherein when the distance between the first and second user mobile devices is less than the sum of the first radius and the second radius the device connection is terminated.

2. The system of claim 1 further comprising a second software application executable on the second user mobile device in communication with the server.

3. The system of claim 1 wherein the fraction of the initial distance is half of the initial distance.

4. The system of claim 1 wherein after the device connection is made the server sends location information to the first and second user mobile devices, wherein the location information includes at least one of estimated time of arrival, distance until user connection and distance between the first user mobile device and the second user mobile device.

5. A computer-readable, non-transitory medium including instructions that, when executed by a source device in cooperation with a server, enables connection of the source device with a recipient device when performing the steps comprising:
   generating a connection request, by a sender, using the source device, for a recipient of the recipient device to connect to the source device,
   receiving the connection request at the server, wherein the server creates a connection request notification,
   transmitting the connection request notification to the recipient device,
   transmitting location data from the source device to the server upon acceptance of the connection request from the recipient device, wherein acceptance of the connection request establishes a device connection between the source device and the recipient device,
   transmitting location data from the recipient device to the server upon acceptance of the connection request by the recipient device, wherein the server establishes an initial distance between the source device and the recipient device upon receipt of location data from the source device and the recipient device,
   transmitting from the server to the recipient device and source device real-time, dynamically updated proximity detail data, wherein the proximity detail data is viewable on the recipient device and the source device,
   transmitting a notification when the source device and the recipient device are within a predetermined fraction of the initial distance from one another, wherein the notification is a push notification, SMS message, text message, email or MMS message that notifies the sender and the recipient that they are a predetermined fraction of the initial distance from one another, wherein the source device includes a first geo-fence having a first radius, wherein the recipient device has a second geo-fence with a second radius, and terminating the device connection when the distance between the source device and the recipient device is less than the sum of the first radius and the second radius.

6. The computer-readable, non-transitory medium of claim 5 wherein the connection request notification includes a customized URL link.

7. The computer-readable, non-transitory medium of claim 5 wherein the proximity detail data includes at least one of estimated time of arrival, distance until user connection or distance between the first user mobile device and the second user mobile device.

8. A computer-implemented method of providing a user connection between first and second user mobile devices, the method comprising the steps of:
- transmitting a connection request, by a sender, from the first user mobile device to a server,
- transmitting the connection request from the server to the second user mobile device,
- wherein when the connection request is accepted by a recipient, the second user mobile device transmits to the server second user mobile device location data, wherein acceptance of the connection request establishes a device connection between the first user mobile device and the second user mobile device,
- transmitting from the first user mobile device first user mobile device location data, wherein the server determines an initial distance between the first user mobile device and the second user mobile device,
- transmitting proximity detail data from the server to the first and second user mobile devices, wherein the proximity detail data includes at least one of estimated time of arrival, distance until user connection or distance between the first user mobile device and the second user mobile device,
- transmitting updated proximity detail data from the server to the first and second user mobile devices at predetermined intervals,
- terminating the transmission of first user mobile device location data to the server when the first and second user mobile devices are within a predetermined distance of one another, and
- transmitting a notification when the first user mobile device and the second user mobile device are within a predetermined fraction of the initial distance from one another, wherein the notification is a push notification, SMS message, text message, email or MMS message that notifies the first and second user mobile devices that they are a predetermined fraction of the initial distance from one another, wherein the first user mobile device includes a first geo-fence having a first radius, wherein the second user mobile device has a second geo-fence with a second radius, and
- terminating the device connection when the distance between the first user mobile device and the second user mobile device is less than the sum of the first radius and the second radius.

9. The computer implemented method of claim 8 wherein the recipient can accept or reject the connection request.

10. A computer-implemented method of providing a user connection between first and second user mobile devices, the method comprising the steps of:
- transmitting a location of a fixed meeting location, by a sender, from the first mobile device to the server,
- transmitting a connection request, by the sender, from the first user mobile device to the server,
- transmitting the connection request from the server to the second user mobile device,
- wherein when the connection request is accepted by a recipient, a device connection is established and the second user mobile device transmits to the server second user mobile device location data,
- transmitting from the first user mobile device location data, wherein the server determines at least a first initial distance,
- transmitting proximity detail data from the server to the first and second user mobile devices, wherein the proximity detail data includes at least one of estimated time of arrival, distance until user connection, distance between the first user mobile device and the fixed meeting location, distance between the second user mobile device and the fixed meeting location or the sum of the distance between the first user mobile device and the fixed meeting location and the distance between the second user mobile device and the fixed meeting location,
- transmitting updated proximity detail data from the server to the first and second user mobile devices at predetermined intervals, and
- terminating the transmission of first user mobile device location data to the server when the first and second user mobile devices are within a predetermined distance of one another,
- wherein the first initial distance is the sum of the distance between the first user mobile device and the fixed meeting location when the device connection is established and the distance between the second user mobile device and the fixed meeting location when the device connection is established.

11. The method of claim 10 wherein the first initial distance is the distance between the first user mobile device and the fixed meeting location and a second initial distance is the second user mobile device and the fixed meeting location.

12. The method of claim 10 wherein when the sum of the distance between the first user mobile device and the fixed meeting location and the distance between the second user mobile device and the fixed meeting location is a predetermined fraction of the first initial distance a notification is transmitted to the first and second user mobile devices.

13. The method of claim 12 wherein when the distance between the first mobile device is a predetermined fraction of the first initial distance a notification is transmitted to the second user mobile device.

14. The method of claim 13 wherein when the distance between the second mobile device is a predetermined fraction of the second initial distance a notification is transmitted to the first user mobile device.

* * * * *